Figure 11:
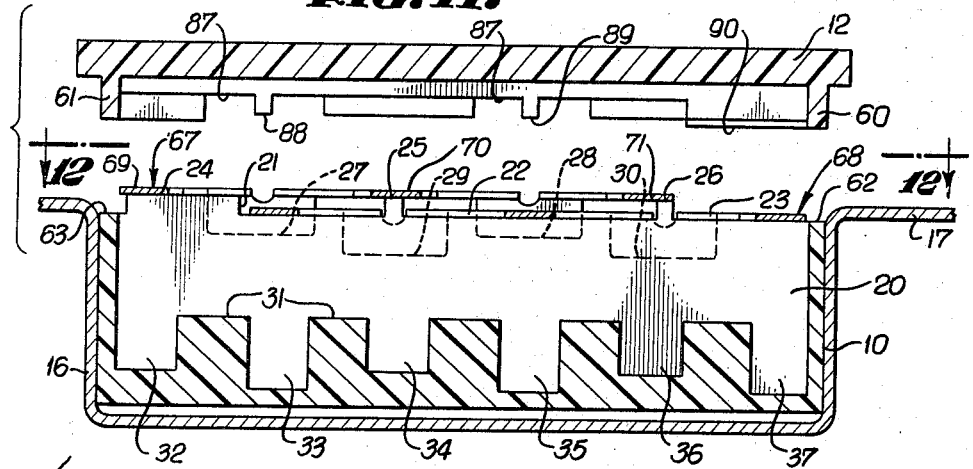

June 20, 1967   R. E. V. RAMSING   3,327,277
GROUNDED ELECTRICAL RECEPTACLES
Filed Sept. 21, 1964   5 Sheets-Sheet 1
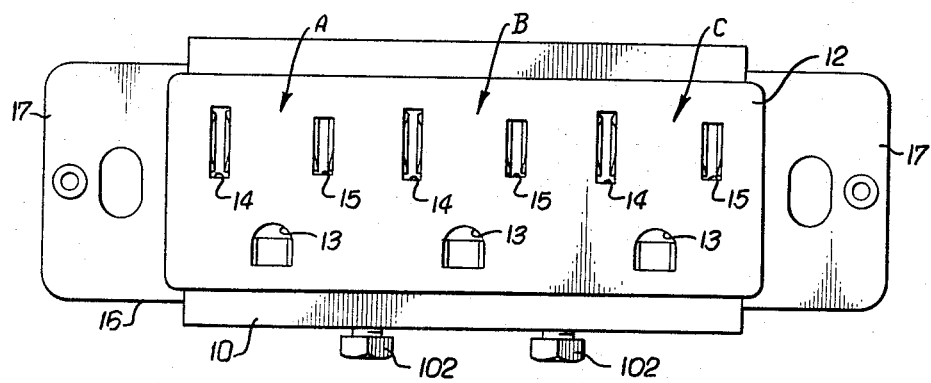
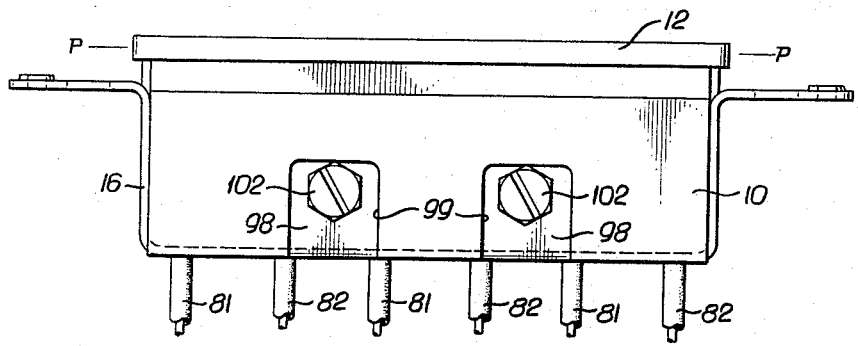
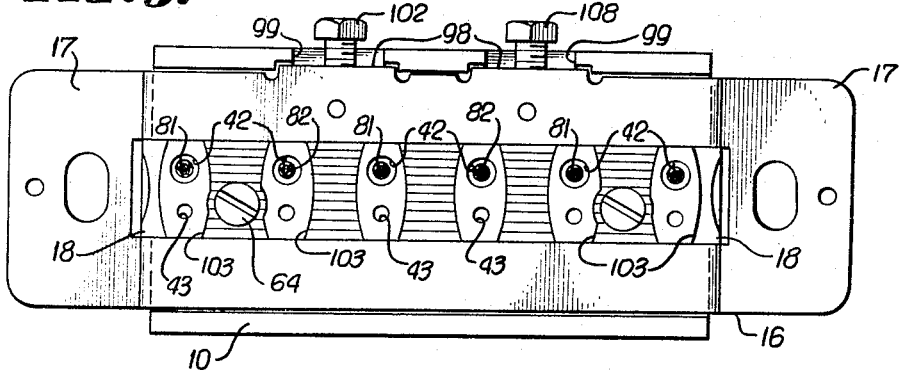
INVENTOR.
ROBERT E. V. RAMSING
BY White & Haefliger
ATTORNEYS.

June 20, 1967   R. E. V. RAMSING   3,327,277
GROUNDED ELECTRICAL RECEPTACLES
Filed Sept. 21, 1964   5 Sheets-Sheet 2
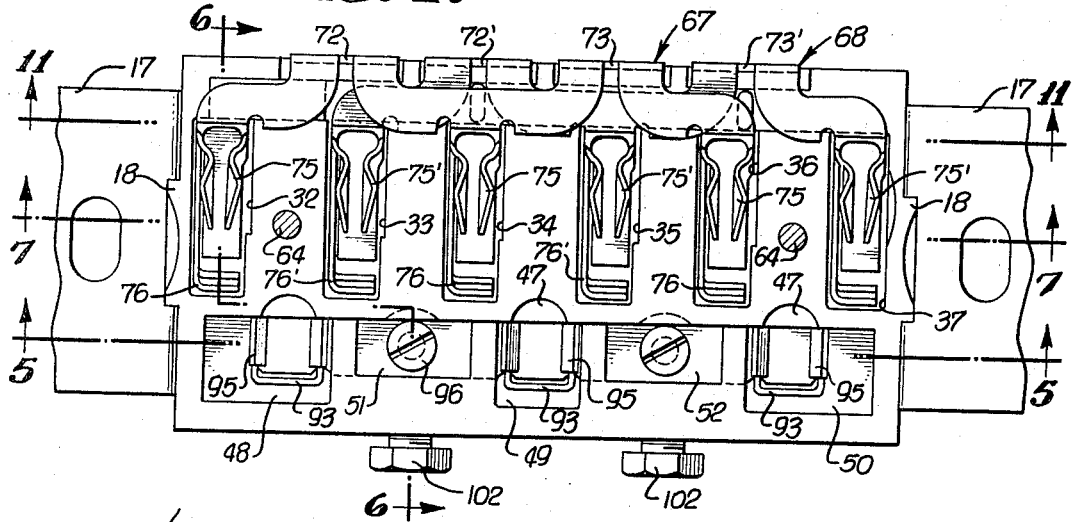
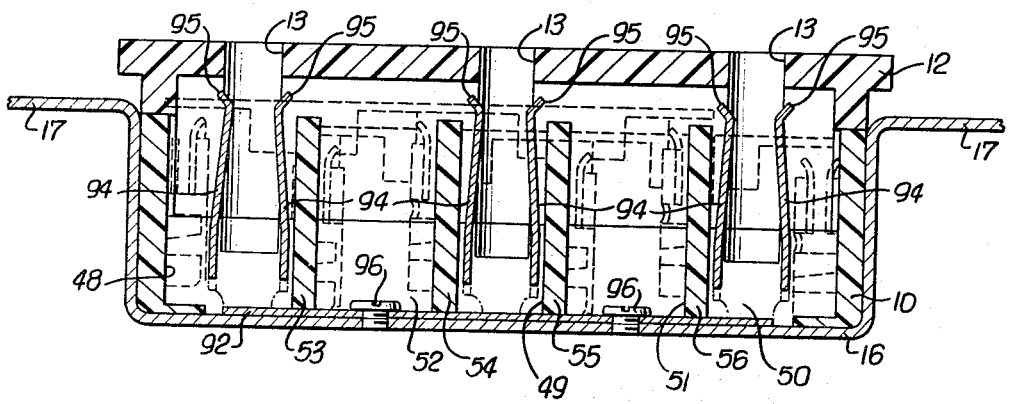
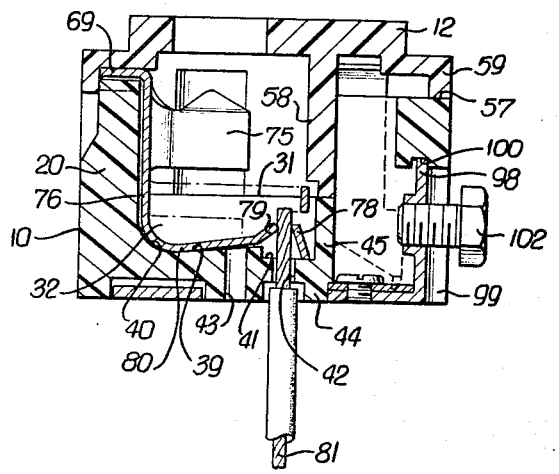
INVENTOR.
ROBERT E. V. RAMSING
BY White & Haefliger
ATTORNEYS.

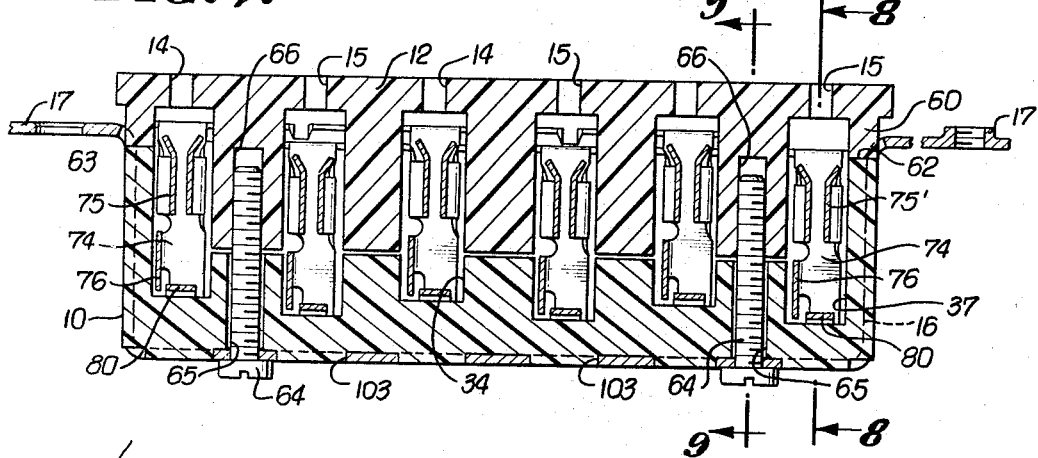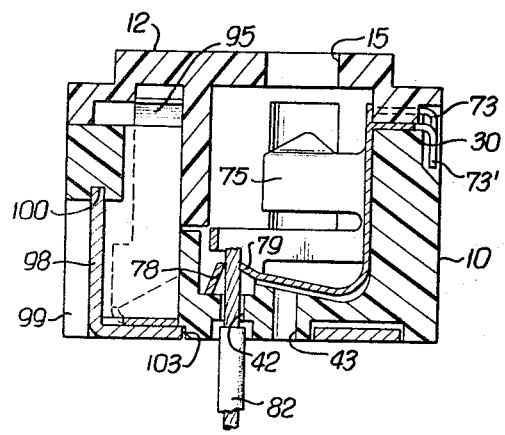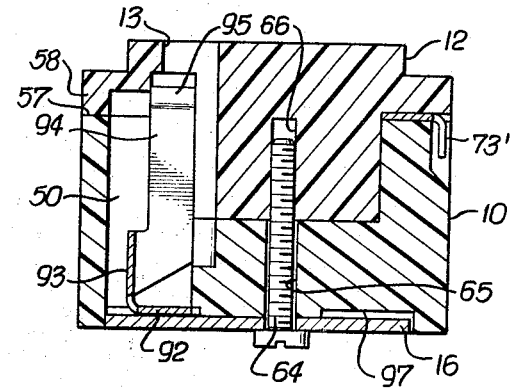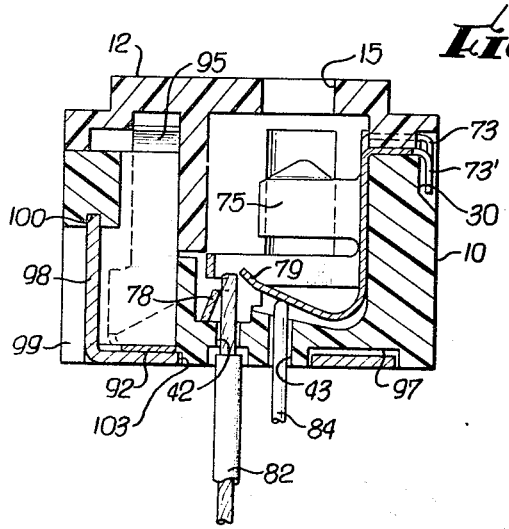

INVENTOR.
ROBERT E. V. RAMSING
BY White & Haefliger
ATTORNEYS.

June 20, 1967        R. E. V. RAMSING        3,327,277
GROUNDED ELECTRICAL RECEPTACLES
Filed Sept. 21, 1964        5 Sheets-Sheet 5
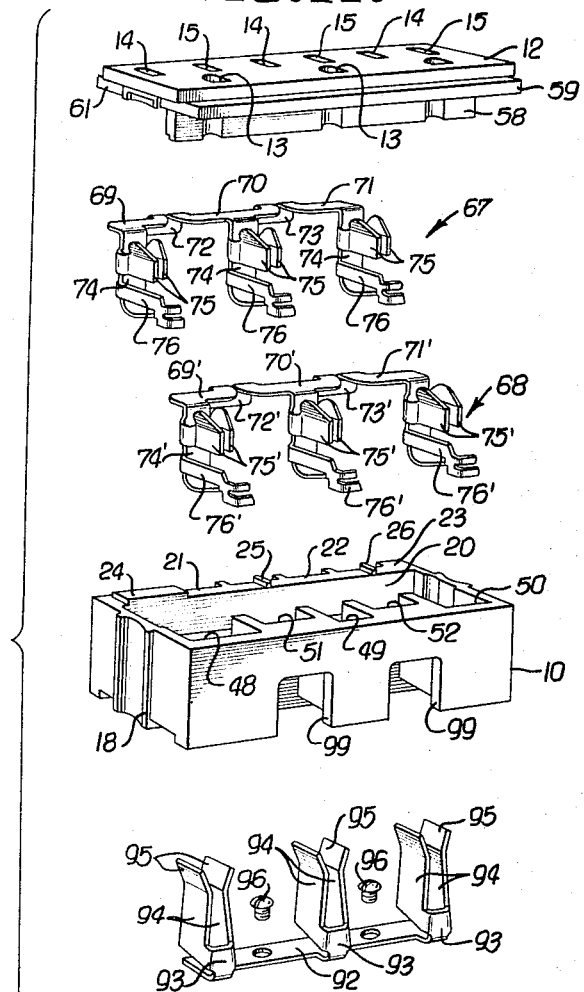
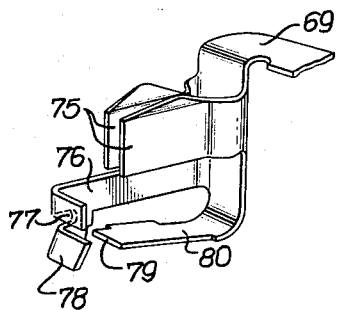
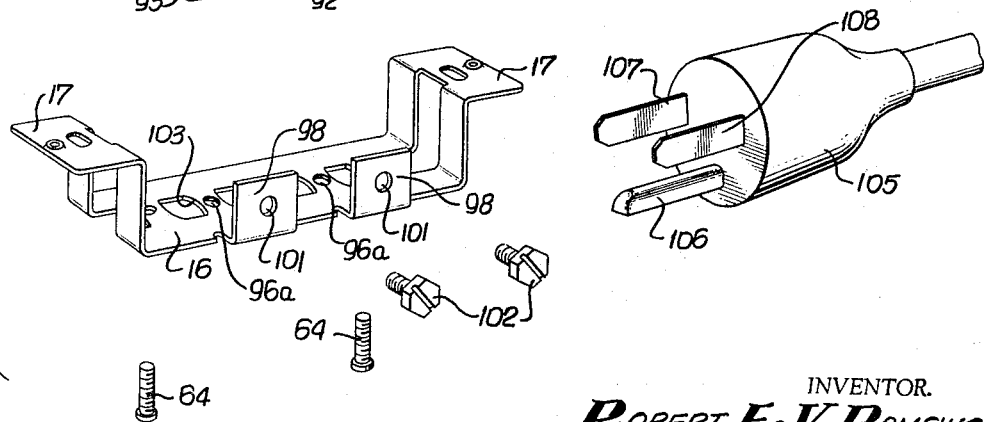
INVENTOR.
ROBERT E. V. RAMSING
BY *White & Haefliger*
ATTORNEYS.

United States Patent Office 3,327,277
Patented June 20, 1967

3,327,277
GROUNDED ELECTRICAL RECEPTACLES
Robert E. V. Ramsing, Whittier, Calif., assignor to Sierra Electric Corporation, Gardena, Calif., a corporation of California
Filed Sept. 21, 1964, Ser. No. 397,944
13 Claims. (Cl. 339—14)

This invention has to do generally with improvements in electrical receptacles of the grounded type and containing contacts adapted to electrically connect with the two equal length current carrying blades and one grounding pin of a conventional two pole grounding type plug-in cap.

For convenience in terminology, the receptacle may be described as comprising in its preferred form an insulative body and removable cover, the body containing a ground contact adapted to be contacted by the cap grounding pin, a first contact or retainer to be contacted by the cap grounded or neutral blade, and a second contact or retainer adapted to receive the positive cap blade.

In certain of its aspects the invention contemplates improvements in receptacles so characterized, whether considered from the standpoint of a single two pole grounded, three conductive component receptacle, or a multiplicity of such receptacles incorporated in a single body structure.

In other aspects, the invention is directed to various objects and advantages having to do with a series composed in effect of a multiplicity of two or more individual two pole grounded three conductive component receptacles as characterized above, and in which the alternate first and second contact sets normally are electrically interconnected by rupturable or removable means permitting of functional isolation of the receptacle units individually.

One major object of the invention is to provide novel forms, mountings and effective positional relations of the ground contact and neutral and positive contacts, such that upon insertion of the blade-carrying cap, its respective blades and pin sequentially connect electrically with the body-contained contacts and terminals in the order named. In this manner the invention achieves both direct and initial grounding of receptacle conductive mounting parts and in the event of disruptions in circuitry connected with the neutral and positive blades, assured current bypassing of such conductive parts by reason of engagement of the neutral blade with its contact before the positive blade conductively engages its contact.

Further in respect to the form of the retainers, the invention contemplates improved structures adapting them to be receptive and releasably self-locking of wire terminals insertable through the wall of the body opposite its cover side.

Other objects of the invention are directed now particularly to its multiple receptacle aspects, as embodied typically in a three receptacle assembly as later described. Here the invention contemplates the provision and use preferably of similar grounding pin and neutral and positive blade contacts separately formed to each present a series of spaced individual blade contacts adapted to be positioned within one side of the body and having interconnections to be received and retained between the cover and body, the body and cover configurations being adapted to accommodate the individual contacts of the two series, in spaced alternation and arrangement such that cap pin and blades sequentially connect first with the receptacle ground contact, then with the neutral contact and finally with the positive contact.

Using contact series of the same configurations, the making of such sequential contacts or connections is effected in a simple manner by differentially spacing the respective series from a cover plane containing the cap pin and blade-passing openings.

Provision is made for selectively isolating the successive receptacles by providing flat conductive interconnections between the individual contacts of three respective series, and conforming the body and cover to accommodate break-out segments of the interconnections positioned accessively but protectively at the outside of the body.

Figure 12:
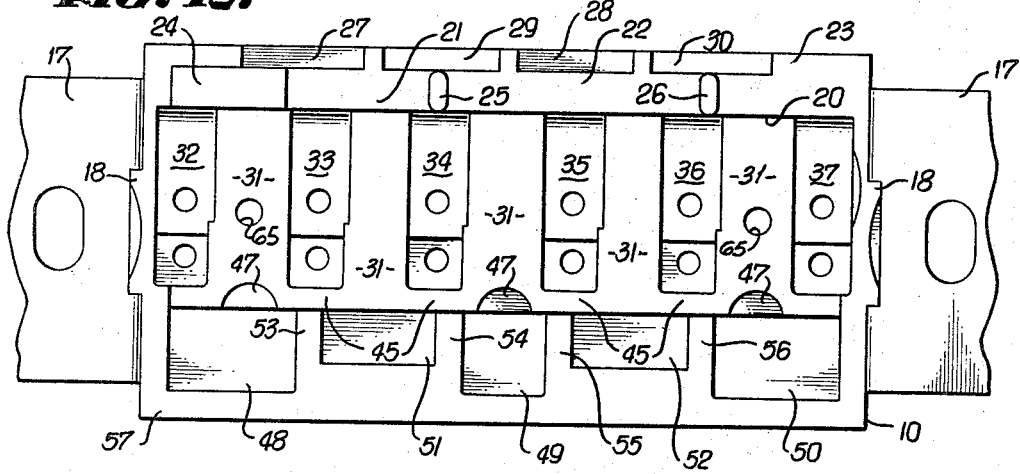
Figure 13:
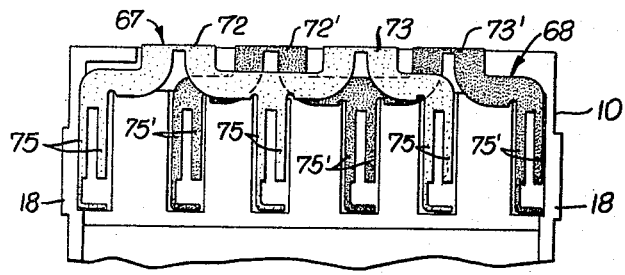

The invention has various additional features and objects, all of which together with those outlined in the foregoing, will be understood from the following detailed description of an illustrative embodiment of the invention, in which:

FIG. 1 is a cover plan view of the receptacle;
FIG. 2 is a front side elevation of FIG. 1;
FIG. 3 is a bottom plan view of FIG. 2;
FIG. 4 is an enlarged scale view in the aspect of FIG. 1, showing the inside of the receptacle with the cover removed;
FIG. 5 is a section taken on line 5—5 of FIG. 4, with the cover replaced;
FIG. 6 is a cross section on broken line 6—6 of FIG. 4;
FIG. 7 is a view similar to FIG. 5, taken on line 7—7 of FIG. 4;
FIGS. 8 and 9 are cross sections taken respectively on lines 8—8 and 9—9 of FIG. 7;
FIG. 10 is a view similar to FIG. 8 illustrating the mode of wire release from one of the retainers;
FIG. 11 is a view taken in the place of line 11—11 of FIG. 4, illustrative of the cover and body configurations and associated portions of the contact series;
FIG. 12 is a plan view of the body from line 12—12 of FIG. 11, with the ground terminals and retainers removed from the body;
FIG. 13 is a diagrammatic view illustrative of the offset relation of the neutral and positive contacts and their respective rupturable interconnections;
FIG. 14 is an exploded view showing in perspective the retainer parts;
FIG. 15 is a fragmentary illustration of one of the retainer prong and wire-receiving terminals; and
FIG. 16 is a perspective showing of a conventional three prong grounding plug.

Referring first to FIGS. 1, 2, 11, 12 and 14, the receptacle is shown to comprise a non-conductive body 10 of suitable electrically insulative material, and a cover 12 of similar material containing typically three series groupings of an opening 13 and slots 14 and 15 adapted serially and respectively to pass the longer length grounding pin and line neutral and line positive blades of a conventional two pole grounding three conductor cap so characterized. As will be understood, the openings 13, 14 and 15 and their associated terminals and contacts to be later described, constitute, in effect, individually functionable contacts in the typical series of three, generally indicated and grouped at A, B and C. The body carries a mounting strap 16 having protruding extensions 17 apertured for the passage of mounting fasteners, and interlocked with projecting ribs 18 on the ends of the body by providing the strap with corresponding openings 19 which receive the ribs. Hereinafter reference will be made to the cover 12 having a plane P—P containing the pin and blade passing openings 13, 14 and 15, as a reference plane for orientation of the ground contacts and line neutral and positive contacts in their effective proximities to the cover openings and the cap pin and blades passing through them.

As viewed in FIGS. 11, 12 and 14, one side 20 of the body presents coplanar surfaces 21, 22 and 23 between which the body has raised portions presenting coplanar surfaces 24, 25 and 26. The corresponding outside of the body wall 20 has upper open top recesses 27 and 28, and similar open top lower recesses 29 and 30 to receive the frangible conductive tabs later described.

Inside, the body has depressed coplanar surfaces 31 between which are formed recesses 32 to 37 aligned with the alternating cover openings 14 and 15, and individually shaped as shown in FIG. 6 to present a base surface 39 curved at 40 at its juncture with the wall 20 and extending upwardly at small angularity toward the interior of the body where the surface drops off to a lower surface at 41. The surfaces 39 and 41 are centrally intersected by openings 42 and 43 extending through the side 44 of the body opposite its cover side.

The innermost ends of the recesses 32 to 37 are closed by the body portions 45 between which the dividing walls surfaced at 31 are vertically recessed at 47 to receive grounding pins as will later appear.

Laterally beyond and exposed to the recesses 47 are body openings 48, 49 and 50, see e.g. FIG. 4, adapted to receive the later described ground terminals. Between openings 48, 49 and 50, the body contains recesses 51 and 52 opening downwardly and outwardly through the body, as for example illustrated in FIG. 6.

The last described openings 48 to 50 and openings 51 and 52, are defined between transverse body web portions 53, 54, 55 and 56 whose exposed surfaces as viewed in FIG. 12, are coplanar with the body surface 57 as illustrated for example in FIG. 6. The cover 12 has a depending longitudinally extending web 58 adapted to engage upon the body portions 45 with the cover flange at 59 engaged against the body surface 57, and the end cover flanges 60 and 61 engaged against the body end surfaces 62 and 63, see e.g. FIG. 7. As shown in FIGS. 7 and 9, the cover 12 is held to the body 10 by screws 64 inserted through the body openings 65 and threaded into the cover bores 66.

As previously indicated, the receptacle preferably utilizes similar or identical line neutral and line positive contact or contact assemblies, shown respectively at 67 and 68 in FIG. 14. Each assembly, which may be stamped or die formed from conductive sheet metal, comprises in the position or aspect viewed, upper flat segments 69, 70 and 71 adapted to overlie the body supporting surfaces as later explained, and interconnected by tabs 72 and 73 which are accommodated within the body outside recesses 27 and 28 so as to be accessibly received therein for breakage out of 69, 70 and 71 as it may be intended that the receptacle units A, B and C function independently. Depending from the coplanar flat extents are shanks 74 carrying inwardly projecting contacts 75 with guide wings and spaced apart so that they will be resiliently spread and caused to releasably retain a cap blade thrust between them. Below the contact portions each shank 74 carries an arm 76 terminally carrying a bend 77 from which depends a jaw 78 opposite the up-turned wire gripping end 79 of a flexible tongue 80 also formed integrally with the shank 74 to directly underlie the contact 75. As shown in FIGS. 6, 8 and 10 the upwardly and inwardly inclined jaw 78 and tongue terminal 79 directly overlie the body openings 42 so that for attachment of the line neutral wires 81 and line positive wires 82 with their respective blade retainers, it is only necessary to thrust the bared ends of the wires between the jaws 78 and 79, whereupon the resilient flexibility of the latter will serve to pinch and retain the wire between the body edges. At this point it may be mentioned that to release the wires, it is only necessary to thrust an appropriate tool 84 through the body opening 43 against the tongue 80 to deflect it as illustrated in FIG. 10 to an extent necessary to free the wire.

The correspondence of the retainer series 67 and 68 is indicated by the use of corresponding reference characters in FIG. 14, with primes added in denoting the series 68 parts.

The accommodation of the two retainer assemblies within the body 10 and their confined retention between the body and cover 12, are best illustrated in FIGS. 4, 8, 10 and 13, the latter being somewhat diagrammatic with the two contacts differently shaded to facilitate their identification in overlying relation. One of the retainer series, e.g. 68 is accommodated within the body recesses 33, 35 and 37 by resting the retainer portion 69', 70' and 71' respectively upon the body surfaces 21, 22 and 23 with the raised body portions 25 and 26 coming respectively between the adjacent outwardly curved extents of 69', 70' and 70', 71'. In this manner the series 68 is positioned at a lower or more inward depth within the body, and with the tabs 72', 73' correspondingly accommodated within recesses 29 and 30, thus to space the prong retainers 75' further from the cover plane P—P than the corresponding parts of the retainer series 67. The latter then is placed to engage its extents 69, 70 and 71 respectively upon the body surfaces 24, 25 and 26 which are parallel to and spaced from the aforementioned surfaces 21, 22 and 23, to correspondingly bring the retainers 75 more closely to the cover plane P—P. In addition to being accommodated within the recesses 32 to 37 as illustrated in FIGS. 6, 8 and 10, the contact series, positioned as described, are clamped between the cover 12 and body 10 by engagement of the cover shoulder surface 87 downwardly against the contact 67 top surfaces 69, 70 and 71, and the engagement of the cover surfaces 88 and 89 downwardly between the outward bends of the upper contacts and against the surfaces of 69' and 70'. Additionally, extent 71' is held in place by engagement with the cover surface 90.

Thus the two contact series are accommodated and maintained in the spaced overlying and offset relation depicted diagrammatically in FIG. 13.

Again referring to FIG. 14, the ground contact assembly generally indicated at 91, comprises a flat conductor base 92 from which bend upwardly and in overlying relation the three contacts 93 each adapted to receive the grounding terminal or pin of a two pole grounding, three conductor plug-in cap. Each of the retainers 93 is shown to comprise spaced flexible portions 94 having guide wings 95 and adapted to receive between them and to resiliently retain the inserted pin. The retainers 93, 94 are received within the body recesses 48, 49 and 50 and are grounded to the strap 16 by screws 96 threaded into the strap openings 96a.

In further reference to the strap 16, the latter is shown as in FIGS. 8 to 10 to be accommodated at 97 within recesses in the body and to have upturned lugs 98 received within the body openings at 99 and grooves 100 within the tops of the openings. The terminals 98 are apertured at 101 to receive grounding screws 102. As best illustrated in FIG. 3, the strap also has a series of openings 103 to expose and permit access to the previously described openings 42 and 43.

FIG. 16 is illustrative of a conventional three prong cap 105 having longer grounding pin 106 and lesser equal length line neutral and line positive blades 107 and 108. The plug is insertable in any of the receptacle units A, B or C by insertion of pin and blades 106, 107 and 108 respectively through openings 13, 14 and 15. The effective ends of the ground contact 93 being now closely positioned in relation to its cover opening 13 or the plane P—P, effective contact occurs first between pin 106 and the portions 94. Then, the line neutral blade 107 makes effective contact with its contact 67, after which positive blade 108 has effective contact with its contact 67, all in a manner such that the three engagements are separately successive.

For purposes known to those familiar with the art, it may be desirable to electrically separate or isolate the successive units A, B and C. Accordingly, tabs 72 and 72' may be broken out of the series' 67 and 68 to separate units A and B, and tabs 73 and 73′ broken out to separate units B and C.

I claim:

1. A two pole, three wire grounding-type electrical receptacle comprising an insulative body and removable cover containing openings for the passage of a longer grounding pin and substantially equal length line neutral and line positive prongs of a plug-in cap, said body containing a ground terminal to be contacted by the grounding pin, a first contact to receive the line neutral blade and a second contact to receive the line positive blade, said terminal and contacts being differentially positioned relative to a cover plane normal to said openings so that said ground terminal and neutral and positive contacts are sequentially conductively engaged by their respective cap pin and blades in the order named.

2. A receptacle according to claim 1, in which said contacts each comprise spaced flexible pin and blade retaining portions in spaced alignment with and positioned toward the line neutral and line positive blade passing openings in the cover, and an arm portion positioned toward the opposite wall of the body and forming a wire-receiving opening and a tongue resiliently deflectable by a wire insertion into the last mentioned opening and operable to releasably retain the wire therein.

3. A receptacle according to claim 2, in which said flexible portions of the line neutral blade contact is positioned closer to a cover plane transverse to said openings than the corresponding flexible portions of the line positive contact.

4. A receptacle according to claim 3, in which said ground terminal comprises flexible portions which are in spaced alignment with the grounding prong passing opening in the cover and extend closer to said plane than said flexible portions of the retainers.

5. A grounded-type composite electrical receptacle device comprising an elongated insulative body and removable cover adapted to form and accommodate a succession of individually functional receptacles, each of said receptacles comprising openings in the cover for the passage of one longer grounding pin and substantially equal length line neutral and line positive blades of a two pole three wire grounding plug-in cap, and within said body a grounding contact to be contacted by the grounding pin, a first contact to receive the line neutral blade and a second contact to receive the line positive blade, said contacts being differentially positioned relative to a cover plane normal to said openings so that said grounding contact and neutral and positive contacts are sequentially conductively engaged by their respective cap pin and blades in the order named, conductive rupturable means interconnecting said first contacts of successive receptacles, conductive rupturable means interconnecting said second contacts of the successive receptacles, and means for connecting wires to the contacts.

6. A receptacle device according to claim 5, in which said contacts and their neutral and positive blade-passing cover openings are aligned longitudinally of the body and the last mentioned cover openings are slots elongated transversely of the cover and are offset toward a first side thereof, the grounding pin contacts and their cover openings being alined longitudinally of the body and being offset toward the opposite side of the cover.

7. A receptacle device according to claim 6, in which both of said rupturable means are accessible at the outside of the body adjacent said first side of the cover.

8. A receptacle device according to claim 7, in which both of said rupturable means comprise flat interconnections of their respective contacts held between the cover and body and presenting rupturable sections at the outside thereof.

9. A receptacle according to claim 8, in which said flat interconnections are retained at different distances toward the wall of the body opposite the cover to correspondingly position the contacts for said sequential pin and blade reception.

10. A receptacle according to claim 9, in which said first and second contacts of the successive receptacles alternate longitudinally of the body.

11. A receptacle according to claim 10, in which said rupturable sections are sections bent from said flat interconnections and received within recesses in the sides of said body.

12. A receptacle according to claim 11, in which said first and second contacts have the same form and structure.

13. A receptacle according to claim 12, in which there are three of said neutral contacts alternating with three of said positive contacts, and in which there are three of said ground contacts.

References Cited

UNITED STATES PATENTS

| 2,068,399 | 1/1937 | Dash et al. | 339—92 |
| 2,946,977 | 7/1960 | Sheldon | 339—95 |
| 2,965,869 | 12/1960 | Ludwig | 339—95 X |
| 3,032,736 | 5/1962 | Howells | 339—14 |
| 3,046,512 | 7/1962 | Remke et al. | 339—14 |

FOREIGN PATENTS

| 98,164 | 3/1923 | Switzerland. | |

MARVIN A. CHAMPION, *Primary Examiner.*

PATRICK A. CLIFFORD, *Examiner.*